US 9,729,473 B2

United States Patent
Haramaty et al.

(10) Patent No.: US 9,729,473 B2
(45) Date of Patent: Aug. 8, 2017

(54) NETWORK HIGH AVAILABILITY USING TEMPORARY RE-ROUTING

(71) Applicant: MELLANOX TECHNOLOGIES LTD., Yokneam (IL)

(72) Inventors: Zachy Haramaty, Hemed (IL); Eitan Zahavi, Zichron Yaakov (IL); Benny Koren, Zichron Yaakov (IL); Ido Bukspan, Herzliya (IL); Itamar Rabenstein, Petah Tikva (IL); Barak Gafni, Kfar Malal (IL); Aviv Kfir, Nili (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 14/745,488

(22) Filed: Jun. 22, 2015

(65) Prior Publication Data
US 2015/0372898 A1   Dec. 24, 2015

Related U.S. Application Data

(60) Provisional application No. 62/015,550, filed on Jun. 23, 2014.

(51) Int. Cl.
*H04L 12/707* (2013.01)
*H04L 12/939* (2013.01)

(52) U.S. Cl.
CPC .................................. *H04L 49/557* (2013.01)

(58) Field of Classification Search
CPC .... H04L 45/22; H04L 45/7453; H04L 49/557
See application file for complete search history.

(56) References Cited

U.S. PATENT DOCUMENTS

| 4,312,064 | A  | 1/1982  | Bench et al. |
| 6,115,385 | A  | 9/2000  | Vig |
| 6,169,741 | B1 | 1/2001  | LeMaire et al. |
| 6,480,500 | B1 | 11/2002 | Erimli et al. |
| 6,532,211 | B1 | 3/2003  | Rathonyi et al. |
| 6,553,028 | B1 | 4/2003  | Tang et al. |

(Continued)

FOREIGN PATENT DOCUMENTS

WO   2016105446 A1   6/2016

OTHER PUBLICATIONS

U.S. Appl. No. 14/046,976 Office Action dated Jan. 14, 2016.
(Continued)

*Primary Examiner* — Jamal Javaid
(74) *Attorney, Agent, or Firm* — D. Kliger IP Services Ltd.

(57) ABSTRACT

A method in a network element that includes multiple interfaces for connecting to a communication network includes receiving via an ingress interface packets that are not allowed to undergo re-routing and that are addressed to a destination via a first egress interface. The packets are forwarded via the first egress interface when there is a valid path from the first egress interface to the destination. When there is no valid path from the first egress interface to the destination, a second egress interface is selected from a group of multiple egress interfaces that have respective paths to the destination and are assigned to packets for which re-routing is allowed, and the packets are forwarded via the second egress interface until recovering a path to the destination.

26 Claims, 3 Drawing Sheets

(56) References Cited

U.S. PATENT DOCUMENTS

| | | | |
|---|---|---|---|
| 6,665,297 | B1 | 12/2003 | Harigochi et al. |
| 6,775,268 | B1 | 8/2004 | Wang et al. |
| 6,804,532 | B1 | 10/2004 | Moon et al. |
| 6,831,918 | B1 | 12/2004 | Kavak |
| 6,912,604 | B1 | 6/2005 | Tzeng et al. |
| 6,950,428 | B1 | 9/2005 | Horst et al. |
| 7,010,607 | B1 | 3/2006 | Bunton |
| 7,076,569 | B1 | 7/2006 | Bailey et al. |
| 7,234,001 | B2 | 6/2007 | Simpson et al. |
| 7,286,535 | B2 | 10/2007 | Ishikawa et al. |
| 7,676,597 | B2 | 3/2010 | Kagan et al. |
| 7,746,854 | B2 | 6/2010 | Ambe et al. |
| 7,936,770 | B1 | 5/2011 | Frattura et al. |
| 7,969,980 | B1 | 6/2011 | Florit et al. |
| 8,094,569 | B2 | 1/2012 | Gunukula et al. |
| 8,175,094 | B2 | 5/2012 | Bauchot et al. |
| 8,195,989 | B1 | 6/2012 | Lu et al. |
| 8,401,012 | B2 | 3/2013 | Underwood et al. |
| 8,489,718 | B1 | 7/2013 | Brar et al. |
| 8,495,194 | B1 | 7/2013 | Brar et al. |
| 8,576,715 | B2 | 11/2013 | Bloch et al. |
| 8,605,575 | B2 | 12/2013 | Gunukula et al. |
| 8,621,111 | B2 | 12/2013 | Marr et al. |
| 8,755,389 | B1 | 6/2014 | Poutievski et al. |
| 8,774,063 | B2 | 7/2014 | Beecroft |
| 8,873,567 | B1 | 10/2014 | Mandal et al. |
| 8,908,704 | B2 | 12/2014 | Koren et al. |
| 9,014,006 | B2 | 4/2015 | Haramaty et al. |
| 9,042,234 | B1 | 5/2015 | Liljenstolpe et al. |
| 9,571,400 | B1 | 2/2017 | Mandal et al. |
| 2002/0013844 | A1 | 1/2002 | Garrett et al. |
| 2002/0026525 | A1 | 2/2002 | Armitage |
| 2002/0039357 | A1 | 4/2002 | Lipasti et al. |
| 2002/0071439 | A1 | 6/2002 | Reeves et al. |
| 2002/0136163 | A1 | 9/2002 | Kawakami et al. |
| 2002/0138645 | A1 | 9/2002 | Shinomiya et al. |
| 2002/0165897 | A1 | 11/2002 | Kagan et al. |
| 2003/0016624 | A1 | 1/2003 | Bare |
| 2003/0039260 | A1 | 2/2003 | Fujisawa |
| 2003/0065856 | A1 | 4/2003 | Kagan et al. |
| 2003/0079005 | A1 | 4/2003 | Myers et al. |
| 2003/0223453 | A1 | 12/2003 | Stoler et al. |
| 2004/0111651 | A1 | 6/2004 | Mukherjee et al. |
| 2004/0202473 | A1 | 10/2004 | Nakamura et al. |
| 2005/0013245 | A1 | 1/2005 | Sreemanthula et al. |
| 2005/0157641 | A1 | 7/2005 | Roy |
| 2005/0259588 | A1 | 11/2005 | Preguica |
| 2006/0126627 | A1 | 6/2006 | Diouf |
| 2006/0182034 | A1 | 8/2006 | Klinker et al. |
| 2006/0291480 | A1 | 12/2006 | Cho et al. |
| 2007/0058536 | A1 | 3/2007 | Vaananen et al. |
| 2007/0058646 | A1 | 3/2007 | Hermoni |
| 2007/0070998 | A1 | 3/2007 | Sethuram et al. |
| 2007/0091911 | A1* | 4/2007 | Watanabe ............... H04L 45/00 370/408 |
| 2007/0223470 | A1 | 9/2007 | Stahl |
| 2007/0237083 | A9 | 10/2007 | Oh et al. |
| 2008/0002690 | A1 | 1/2008 | Ver Steeg et al. |
| 2008/0112413 | A1 | 5/2008 | Pong |
| 2008/0165797 | A1 | 7/2008 | Aceves |
| 2008/0189432 | A1 | 8/2008 | Abali et al. |
| 2008/0267078 | A1 | 10/2008 | Farinacci et al. |
| 2008/0298248 | A1 | 12/2008 | Roeck et al. |
| 2009/0103534 | A1 | 4/2009 | Malledant et al. |
| 2009/0119565 | A1 | 5/2009 | Park et al. |
| 2010/0039959 | A1 | 2/2010 | Gilmartin |
| 2010/0049942 | A1 | 2/2010 | Kim et al. |
| 2010/0111529 | A1 | 5/2010 | Zeng et al. |
| 2010/0141428 | A1* | 6/2010 | Mildenberger ...... G08B 25/009 340/539.11 |
| 2010/0216444 | A1* | 8/2010 | Mariniello ........... H04Q 3/0041 455/417 |
| 2010/0284404 | A1 | 11/2010 | Gopinath et al. |
| 2010/0290385 | A1 | 11/2010 | Ankaiah et al. |
| 2010/0315958 | A1 | 12/2010 | Luo et al. |
| 2011/0019673 | A1 | 1/2011 | Fernandez Gutierrez |
| 2011/0085440 | A1 | 4/2011 | Owens et al. |
| 2011/0085449 | A1 | 4/2011 | Jeyachandran et al. |
| 2011/0090784 | A1 | 4/2011 | Gan |
| 2011/0164496 | A1 | 7/2011 | Loh et al. |
| 2011/0225391 | A1 | 9/2011 | Burroughs et al. |
| 2011/0249679 | A1 | 10/2011 | Lin et al. |
| 2011/0255410 | A1 | 10/2011 | Yamen et al. |
| 2011/0265006 | A1 | 10/2011 | Morimura et al. |
| 2011/0299529 | A1 | 12/2011 | Olsson et al. |
| 2012/0020207 | A1 | 1/2012 | Corti et al. |
| 2012/0082057 | A1 | 4/2012 | Welin et al. |
| 2012/0144064 | A1 | 6/2012 | Parker et al. |
| 2012/0144065 | A1 | 6/2012 | Parker et al. |
| 2012/0147752 | A1 | 6/2012 | Ashwood-Smith et al. |
| 2012/0163797 | A1 | 6/2012 | Wang |
| 2012/0207175 | A1 | 8/2012 | Raman et al. |
| 2012/0300669 | A1 | 11/2012 | Zahavi |
| 2012/0314706 | A1 | 12/2012 | Liss |
| 2013/0044636 | A1 | 2/2013 | Koponen et al. |
| 2013/0071116 | A1 | 3/2013 | Ong |
| 2013/0083701 | A1 | 4/2013 | Tomic et al. |
| 2013/0114599 | A1 | 5/2013 | Arad |
| 2013/0114619 | A1 | 5/2013 | Wakumoto |
| 2013/0170451 | A1 | 7/2013 | Krause et al. |
| 2013/0208720 | A1 | 8/2013 | Ellis et al. |
| 2013/0242745 | A1 | 9/2013 | Umezuki |
| 2013/0301646 | A1 | 11/2013 | Bogdanski et al. |
| 2013/0315237 | A1 | 11/2013 | Kagan et al. |
| 2013/0322256 | A1 | 12/2013 | Bader et al. |
| 2013/0336116 | A1 | 12/2013 | Vasseur et al. |
| 2014/0043959 | A1 | 2/2014 | Owens et al. |
| 2014/0140341 | A1 | 5/2014 | Bataineh et al. |
| 2014/0192646 | A1 | 7/2014 | Mir et al. |
| 2014/0313880 | A1 | 10/2014 | Lu et al. |
| 2014/0328180 | A1 | 11/2014 | Kim et al. |
| 2014/0343967 | A1 | 11/2014 | Baker |
| 2015/0030033 | A1 | 1/2015 | Vasseur et al. |
| 2015/0052252 | A1 | 2/2015 | Gilde et al. |
| 2015/0092539 | A1 | 4/2015 | Sivabalan et al. |
| 2015/0098466 | A1 | 4/2015 | Haramaty et al. |
| 2015/0124815 | A1 | 5/2015 | Beliveau et al. |
| 2015/0163144 | A1 | 6/2015 | Koponen et al. |
| 2015/0194215 | A1 | 7/2015 | Douglas et al. |
| 2016/0014636 | A1 | 1/2016 | Bahr et al. |
| 2016/0080120 | A1 | 3/2016 | Unger et al. |
| 2016/0182378 | A1 | 6/2016 | Basavaraja et al. |

OTHER PUBLICATIONS

U.S. Appl. No. 14/662,259 Office Action dated Sep. 22, 2016.

Afek et al., "Sampling and Large Flow Detection in SDN", SIGCOMM '15, pp. 345-346, Aug. 17-21, 2015, London, UK.

"Equal-cost multi-path routing", Wikipedia, 2 pages, Oct. 13, 2014.

Thaler et al., "Multipath Issues in Unicast and Multicast Next-Hop Selection", Network Working Group, RFC 2991, 9 pages, Nov. 2000.

Nkposong et al., "Experiences with BGP in Large Scale Data Centers:Teaching an old protocol new tricks", 44 pages, Jan. 31, 3014.

Mahalingam et al., "VXLAN: A Framework for Overlaying Virtualized Layer 2 Networks over Layer 3 Networks", Internet Draft, 20 pages, Aug. 22, 2012.

Sinha et al., "Harnessing TCP's Burstiness with Flowlet Switching", 3rd ACM SIGCOMM Workshop on Hot Topics in Networks (HotNets), 6 pages, Nov. 11, 2004.

Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.

NOWLAB—Network Based Computing Lab, 2 pages, years 2002-2015 http://nowlab.cse.ohio-state.edu/publications/conf-presentations/2007/vishnu-ccgrid07.pdf.

Alizadeh et al.,"CONGA: Distributed Congestion-Aware Load Balancing for Datacenters", Cisco Systems, 12 pages, Aug. 9, 2014.

Geoffray et al., "Adaptive Routing Strategies for Modern High Performance Networks", 16th IEEE Symposium on High Performance Interconnects (HOTI '08), pp. 165-172, Aug. 26-28, 2008.

(56) References Cited

OTHER PUBLICATIONS

Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Glass et al., "The turn model for adaptive routing", Journal of the ACM, vol. 41, No. 5, pp. 874-903, Sep. 1994.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.
Infiniband Trade Association, "InfiniBandTM Architecture Specification Volume 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03), Nice, France, 10 pages, Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
U.S. Appl. No. 14/046,976 Office Action dated Jun. 2, 2015.
Li et al., "Multicast Replication Using Dual Lookups in Large Packet-Based Switches", 2006 IET International Conference on Wireless, Mobile and Multimedia Networks, , pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
U.S. Appl. No. 12/910,900 Office Action dated Apr. 9, 2013.
Haramaty et al., U.S. Appl. No. 14/732,853, filed Jun. 8, 2015.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
U.S. Appl. No. 14/337,334 Office Action dated Oct. 20, 2016.
Dally et al., "Deadlock-Free Message Routing in Multiprocessor Interconnection Networks", IEEE Transactions on Computers, vol. C-36, No. 5, May 1987, pp. 547-553.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
U.S. Appl. No. 14/732,853 Office Action dated Jan. 26, 2017.
U.S. Appl. No. 14/970,608 Office Action dated May 30, 2017.
U.S. Appl. No. 14/673,892 Office Action dated Jun. 1, 2017.

\* cited by examiner

NETWORK HIGH AVAILABILITY USING TEMPORARY RE-ROUTING

CROSS-REFERENCE TO RELATED APPLICATIONS

This application claims the benefit of U.S. Provisional Patent Application 62/015,550, filed Jun. 23, 2014, whose disclosure is incorporated herein by reference.

FIELD OF THE INVENTION

The present invention relates generally to communication networks, and particularly to methods and systems for providing network high availability using temporary re-routing.

BACKGROUND OF THE INVENTION

Various communication networks manage traffic routing, including recovery from route failure. For example, a network may comprise a centralized element or run a routing protocol that re-routes the traffic of a failing route via an alternative path. Methods for re-routing upon failure are known in the art.

For example, U.S. Patent Application Publication 2011/0249679, whose disclosure is incorporated herein by reference, describes a method for implementing fast re-route (FRR) by starting up an upper layer software protocol to manage and configure a FRR route. The upper layer software protocol sends down an active next hop of the FRR and a driver writes an IP address of the FRR into an ECMP table and creating a software table to record correspondence between a FRR group and an ECMP group. The upper layer software protocol informs the driver of a prefix address of a subnet route and the index of the FRR group. The driver finds the index of the ECMP group, and writes information of the subnet route and the index of the ECMP group into hardware. The upper layer software protocol informs the driver of the index of the FRR and an IP address of a new standby next hop. The driver looks up for the index of the ECMP group, and updates the next hop address of the ECMP group.

As another example, U.S. Pat. No. 7,234,001, whose disclosure is incorporated herein by reference, describes a method and apparatus that provide protection against resource failures in Open Shortest Path First (OSPF) networks. An internal router (IR) automatically maintains a back-up link in a dormant state until a network failure affecting communications with a primary adjacent area border router (ABR) is detected. Upon detection of the network failure, the IR activates the back-up link in order to enable traffic flow to an alternate adjacent ABR, which by-passes the network failure. Upon recovery of communications with the primary adjacent ABR, the IR automatically deactivates the back-up link and resumes traffic flow through the primary adjacent ABR.

As yet another example, in "Network Architecture for Joint Failure Recovery and Traffic Engineering," whose disclosure is incorporated herein by reference, Suchara et al. describe a unified way to balance traffic load efficiently under a wide range of failure scenarios. The proposed architecture supports flexible splitting of traffic over multiple precomputed paths, with efficient path-level failure detection and automatic load balancing over the remaining paths. The authors propose two candidate solutions that differ in how the routers re-balance the load after a failure, leading to a trade-off between router complexity and load-balancing performance.

SUMMARY OF THE INVENTION

An embodiment of the present invention that is described herein provides a method in a network element that includes multiple interfaces for connecting to a communication network, including receiving via an ingress interface packets that are not allowed to undergo re-routing and that are addressed to a destination via a first egress interface. The packets are forwarded via the first egress interface when there is a valid path from the first egress interface to the destination. When there is no valid path from the first egress interface to the destination, a second egress interface is selected from a group of multiple egress interfaces that have respective paths to the destination and are assigned to packets for which re-routing is allowed, and the packets are forwarded via the second egress interface until recovering a path to the destination.

In some embodiments, the first egress interface is additionally assigned within the group of multiple egress interfaces only for packets for which re-routing is allowed. In other embodiments, the first egress interface is not assigned within the group of multiple egress interfaces for which re-routing is allowed. In yet other embodiments, selecting the second egress interface includes switching to the second egress interface in response to detecting, by the network element, that there is no valid path from the first egress interface to the destination.

In an embodiment, selecting the second egress interface includes switching to the second egress interface in response to receiving from the communication network a notification indicating that a route to the destination that traverses the first egress interface has failed. In another embodiment, recovering the path includes re-configuring the network element based on a global, network-wide routing decision. In yet another embodiment, forwarding the packets via the second interface includes forwarding all the packets destined to the first egress interface via the second egress interface.

In some embodiments, selecting the second egress interface includes choosing the second egress interface from among the multiple egress interfaces in the group, based on one or more fields in headers of the packets. In other embodiments, choosing the second egress interface includes holding a table that maps hash results calculated over the fields to respective egress interfaces in the group. In yet other embodiments, choosing the second egress interface includes calculating a hash function having a number of hash results equal to a number of entries of the table that are mapped to egress interfaces that have a valid path to the destination.

In an embodiment, choosing the second egress interface includes removing from the table one or more entries that are mapped to one or more egress interfaces that have no valid paths to the destination, and calculating a hash function having a number of hash results equal to a remaining number of entries corresponding to egress interfaces that have valid paths to the destination. In another embodiment, selecting the second egress interface includes switching to the second egress interface once, and not re-switching again until recovering the path to the destination or until forwarding the packets via the second egress interface to the destination fails. In yet another embodiment, the method includes receiving via the ingress interface packets to be delivered to the destination via a third egress interface that belongs to the group, forwarding the packets via the third egress interface when there is a valid path from the third egress interface to the destination, and, when there is no valid path from the third egress interface to the destination, selecting a fourth egress interface within the group that has a valid path to the destination, and forwarding the packets via the fourth egress interface until recovering a path to the destination.

There is additionally provided, in accordance with an embodiment of the present invention, a network element that includes multiple interfaces and switching circuitry. The interfaces are configured to connect to a communication network. The switching circuitry is configured to receive via an ingress interface packets that are not allowed to undergo re-routing and that are addressed to a destination via a first egress interface, to forward the packets via the first egress interface when there is a valid path from the first egress interface to the destination, and, when there is no valid path from the first egress interface to the destination, to select a second egress interface from a group of multiple egress interfaces that have respective paths to the destination and are assigned to packets for which re-routing is allowed, and to forward the packets via the second egress interface until recovering a path to the destination.

There is additionally provided, in accordance with an embodiment of the present invention, a method in a network element that comprises multiple interfaces for connecting to a communication network. A packet for which re-routing is allowed and that is addressed to a destination via a group of multiple first egress interfaces that have respective paths to the destination is received via an ingress interface. The packet is forwarded to the destination, via the group, when there is a valid path from at least one of the first egress interfaces to the destination. When there is no valid path from any of the first egress interfaces to the destination. A second egress interface outside the group that has a valid path to the destination is selected, and the packet is forwarded via the second egress interface until recovering a path from the first egress interfaces to the destination.

There is additionally provided, in accordance with an embodiment of the present invention, a network element that comprises multiple interfaces and switching circuitry. The multiple interfaces are configured to connect to a communication network. The switching circuitry is configured to receive via an ingress interface a packet for which re-routing is allowed and that is addressed to a destination via a group of multiple first egress interfaces that have respective paths to the destination, to forward the packet to the destination, via the group, when there is a valid path from at least one of the first egress interfaces to the destination, and, when there is no valid path from any of the first egress interfaces to the destination, to select a second egress interface outside the group that has a valid path to the destination, and to forward the packet via the second egress interface until recovering a path from the first egress interfaces to the destination.

The present invention will be more fully understood from the following detailed description of the embodiments thereof, taken together with the drawings in which:

DETAILED DESCRIPTION OF EMBODIMENTS

Overview

Embodiments of the present disclosure that are described herein provide improved methods and systems for fast re-routing of a flow (or part thereof) to an alternative path in case of failure. The flow is typically re-routed until the failing route recovers or until the network re-configures the paths in the network using a centralized network element or a routing protocol. In the disclosed embodiments, the decisions related to fast re-routing are made locally by the network elements.

The description that follows refers mainly to network elements that comprise network switches. Alternatively, the network elements may comprise routers, bridges, gateways, or any other suitable type of network elements.

A network element such as a switch typically comprises multiple ports connecting to the network. Ports that are configured to receive or transmit packets are also referred to as ingress interfaces and egress interfaces, respectively.

In the description that follows, the term "flow" refers to a sequence of packets that are delivered from a source to a destination over the network. A given flow may comprise packets that should be delivered in order (e.g., TCP packets) as well as packets that are allowed to be delivered out of order (e.g., UDP packets).

In some embodiments, the switch assigns an egress interface to packets that require static routing, i.e., a route that does not change over time. For example, packets that should arrive at the destination in the same order they were sent may be assigned static routing. For packets that require static routing, this egress interface is also referred to as a static egress interface. The switch additionally configures a group of multiple egress interfaces in which re-routing within the group is allowed. Such a group may be used, for example, for adaptive routing (AR) and is referred to herein as an AR group. Note that the AR group can be used for other purposes, e.g., in load balancing such as in equal-cost multi-path routing (ECMP). In general, routing using an AR group is also referred to as dynamic routing.

A given switch may allow adaptive routing for some packets, e.g., when this interface belongs to an AR group, and force static routing for other packets.

In some embodiments, for a given flow, the egress interface that is assigned to route statically packets that require static routing also belongs to the AR group, i.e., with respect to the flow packets that are allowed to be routed adaptively. The disclosed techniques apply for both cases in which the static egress interface belongs, or does not belong, to the AR group. Alternatively, an egress interface may be assigned for static routing with respect to one flow and the AR group with respect to other one or more flows.

In some of the disclosed embodiments, when the currently used static route that passes via the static egress interface fails, the switch selects a fallback interface within the AR group and forwards the packets via the selected interface rather than via the static egress interface. The switch may use any suitable method to detect a failing route. In an example embodiment, the switch detects that the link connecting to the static egress interface is disconnected or has failed for any other reason. Alternatively, the switch receives from other elements in the network a notification that indicates the failing route.

The switch may select a fallback interface in various ways. In some embodiments, the fallback interface is pre-defined during initial configuration of the switch. Alternatively, the switch selects the fallback interface when actually re-routing the packets.

In some embodiments, selecting the fallback interface is based on certain fields in the packet headers, such as, for example, one or more of the source/destination address, source/destination port and the underlying protocol. In an embodiment, the switch calculates a hash function over one or more packet fields, and selects the fallback interface based on the hash result. For example, the switch may hold one or more tables that map hash values to respective egress interfaces in the AR group, and select one of the tables based, for example, on the destination address.

In some embodiments, when the hash result corresponds to a failing route, the switch attempts another selection, for example, using a random selection, by calculating a hash function with a smaller number of possible hash results, or by excluding from the table entries corresponding to one or more failing routes.

The methods described above are also applicable to situations in which a route from an egress interface that belongs to the AR group fails. In such situations, the switch may use methods similar to the methods described above for selecting a fallback interface within the AR group.

In the disclosed techniques, the switch re-routes packets that are to be forwarded statically via a failing route to a fallback interface that belongs to a group of interfaces that normally use for adaptive routing. For a given flow, the switch selects a single fallback interface, and therefore the flow is re-routed once, which may result with only temporary out-of-order packet delivery.

Although re-configuring while having a global network view such as when using a routing protocol may result in better utilization of network resources, the local re-routing is typically much faster than re-configuring the paths by a centralized element or by a routing protocol and therefore significantly improves high availability capabilities in the network.

System Description

Figure 1:
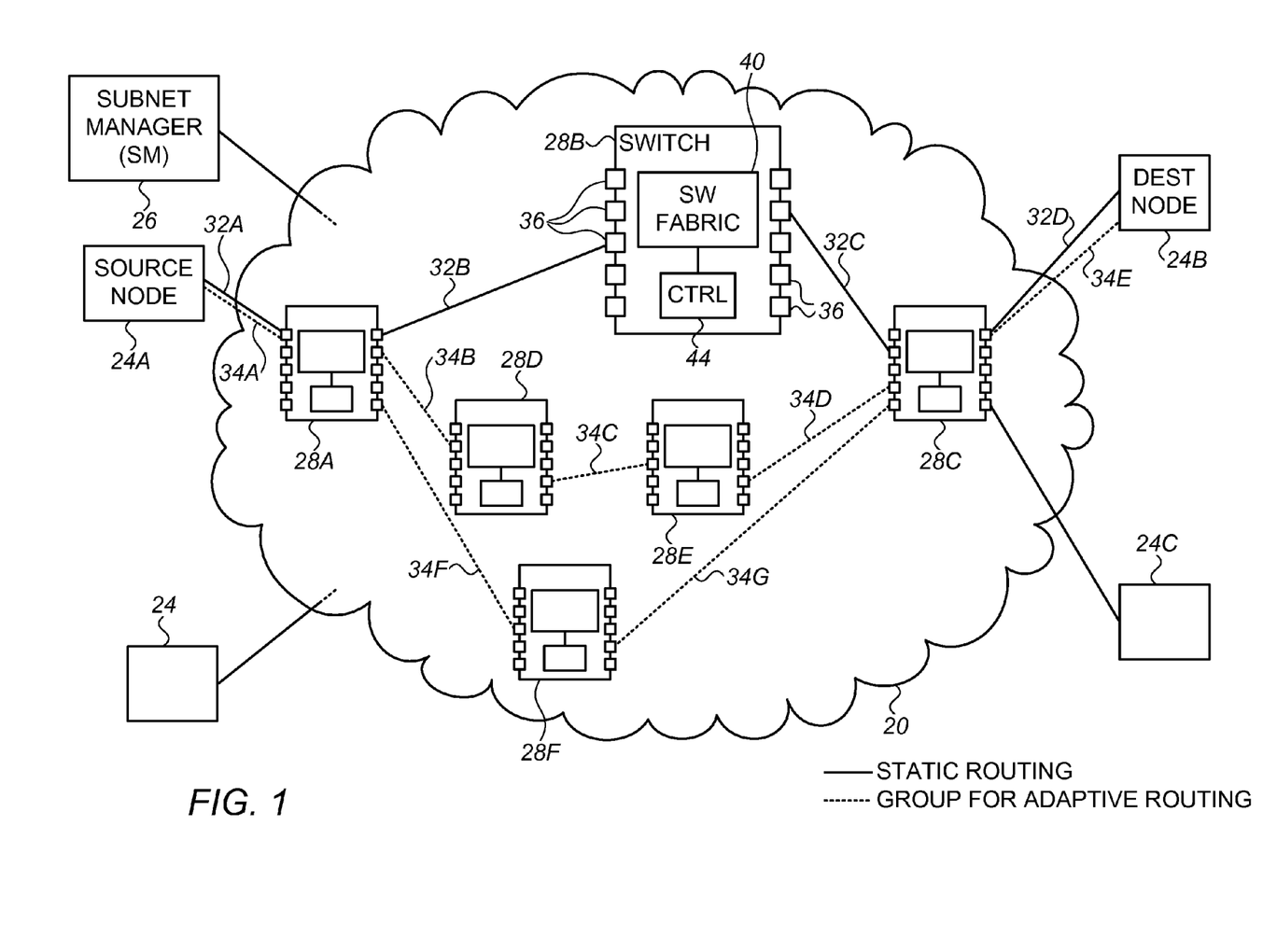
FIG. 1 is a block diagram that schematically illustrates a communication network that provides high availability, in accordance with an embodiment that is described herein.

FIG. 1 is a block diagram that schematically illustrates a communication network 20 that provides high availability, in accordance with an embodiment that is described herein. In the present example, network 20 operates in accordance with the Infiniband® specifications. In alternative embodiments, network 20 may operate in accordance with other suitable communication standards or protocols, such as variants of converged Ethernet as described in the IEEE 802.1Q standard. Further alternatively, other suitable packet networks such as IP networks can also be used.

Network 20 provides packet communication for multiple nodes 24. A node may comprise, for example, a Host Channel Adapter (HCA) or other Network Interface Card (NIC) of a computer. Each flow of packets originates from a certain source node and is addressed to a certain destination node. The packets of the flow are forwarded over a route through the network that traverses various switches 28 and network links 32 and 34. The links are assumed bidirectional. In the disclosed embodiments, network 20 supports multi-path communication, i.e., a source node may communicate with a destination node over multiple routes or paths simultaneously.

Since different routes may have different latencies, re-routing a flow may result in out-of-order packet delivery to the destination. In the description that follows the term "static routing" means that the route does not change over time. In other words, packets of a flow that require static routing are delivered via the same path of switches and network links. A static route can be assigned to one or more flows simultaneously. For example, in FIG. 1, the path comprising links 32A . . . 32D (solid line) is configured as a static route for a given flow.

Re-routing may be applied to flows that permit out of order packet delivery. For example, in FIG. 1, switch 28A receives packets via link 34A and may forward the packets via a network link 34B or 34F over different routes that converge via link 34E toward the same destination. Dynamic re-routing can be used, for example, for traffic load balancing or when applying adaptive routing (AR).

Note that a route or part thereof can deliver both packets that require static routing and packets that are allowed adaptive routing. For example, in FIG. 1 the route segment via links 34B-34D toward node 24B serves as an AR group for certain packets, but may be configured as a static route for packets destined to node 24C.

In an Infiniband application, the switches and links belong to a certain Infiniband subnet that is managed by a Subnet Manager (SM) 26. Without loss of generality the SM may be embodied in one of the switches, e.g., in switch 28A. Other networks, such as IP networks, are typically managed using a routing protocol such as, for example, the Open Shortest Path First (OSPF) protocol, the Intermediate System to Intermediate System (IS-IS) protocol or the Border Gateway Protocol (BGP). In order to demonstrate the disclosed techniques, the figure shows a simplified example of a source node, a destination node, switches 28A . . . 28F, links 32A . . . 32D that are part of a static route for a given flow, and links 34A . . . 34G that are part of routes that participate in adaptive routing for the same or other flows. In a real-life network, the switches may be interconnected in various topologies. An example Fat-Tree (FT) topology is addressed in greater detail further below.

Each switch 28 comprises multiple ports 36 that are configured to receive and transmit packets, switch fabric 40 that is configured to forward the packets between the ports, and a control unit 44 that controls and configures the various switch elements. Among other tasks, control units 44 of the switches in network 20 carry out re-routing techniques to provide high availability in network 20.

Switch ports 36 that are configured to receive packets are also referred to as ingress interfaces and ports that are configured to transmit packets are also referred to as egress interfaces. For a given flow, an egress interface can be configured to deliver all the flow packets statically or adaptively. Alternatively, the egress interface may be configured to deliver certain flow packets statically and other packets adaptively.

A currently used route may fail at some point in time. For example, a link along the route path may be disconnected or otherwise fail. Alternatively or additionally, a switch in the route path may malfunction. In some embodiments, a centralized element in the network, such as SM 26, is notified about a failing route and re-configures the switches to create an alternative route. In other embodiments, a switch communicates with other switches in the network using a routing protocol to re-configure the routing paths. As noted, recovering the path is not limited to local switch decisions, and therefore re-configuring the switch is rather based on a global, network-wide routing decision.

The description that follows refers to a certain partitioning of functions between the switch fabric and the control unit. In alternative embodiments, however, any other suitable functional partitioning can be used. In the context of the present patent application and in the claims, switch fabric 40 and control unit 44 are referred to jointly as switching circuitry that carries out the methods described herein.

The network and switch configurations shown in FIG. 1 are example configurations, which are chosen purely for the sake of conceptual clarity. In alternative embodiments, any other suitable network and/or switch configuration can be used. Certain switch elements may be implemented using hardware/firmware, such as using one or more Application-Specific Integrated Circuits (ASICs) or Field-Programmable Gate Arrays (FPGAs). Alternatively, some switch elements may be implemented in software or using a combination of hardware/firmware and software elements.

In some embodiments, certain switch functions, such as certain functions of control unit 44, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Methods for Providing High Availability

Figure 2:
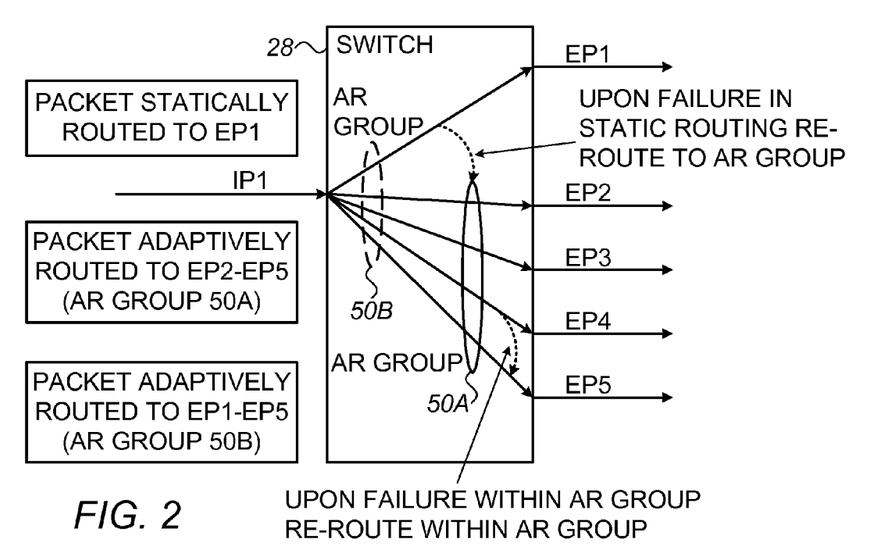
FIG. 2 is a diagram that schematically describes re-routing methods, in accordance with embodiments that are described herein.

FIG. 2 is a diagram that schematically describes re-routing methods, in accordance with embodiments that are described herein. Switch 28 in FIG. 2 is assumed to be similar to switches 28 in FIG. 1. In FIG. 2, switch 28 receives, at an ingress interface IP1, packets that originate in a source node and that are addressed to a destination node. Switch 28 forwards each of the packets received via IP1 to one of egress interfaces EP1 . . . EP5. In the description that follows we assume that each of interfaces EP1 . . . EP5 belongs to a respective functional route from the source node to the destination node. The packets received via IP1 may belong to a given flow of which some packets permit re-routing and others do not.

In the present example, EP1 is configured as a static egress interface for packets of a given flow that require in-order delivery. Thus, the switch forwards packets of the given flow that should be delivered to the destination in the same order they were sent via EP1. Additionally, EP2 . . . EP5 are configured as a group 50A of egress interfaces for other packets of the given flow that are allowed out-of-order delivery, wherein re-routing within the group is allowed. For example, EP2 . . . EP5 can serve as an AR group for adaptive routing. Alternatively, EP2 . . . EP5 serve in applying equal-cost multi-path routing (ECMP) or in other suitable load balancing methods. Switch 28 is configured to forward packets that are allowed to undergo out-of-order delivery to one of egress interfaces EP2 . . . EP5.

In alternative embodiments, EP1 . . . EP5 are all assigned as an AR group 50B, and EP1 additionally serves as a static egress interface for the packets of the given flow that require in-order delivery. In this case, the switch forwards incoming packets statically via EP1 or adaptively via one of EP1 . . . EP5 based on certain fields in the packets. Although the techniques described below refer mainly to the case in which EP1 is assigned only for static routing, these techniques are similarly applicable to the case in which EP1 belongs to the AR group.

Consider now an event in which the route via EP1 to the destination fails. As a result, the packets that the switch normally forwards to EP1 may be lost. In some embodiments, when the route via EP1 fails, the switch re-routes packets that should be forwarded via EP1 to a fallback egress interface selected from EP2 . . . EP5. This re-routing may persist until a suitable condition is met.

For example, the switch re-routes the packets until the failing route recovers, e.g., a failing link or switch along the failing route recovers, or until the SM or a routing protocol re-configures the switch. Note that the switch selects only a single egress interface out of EP2 . . . EP5 to replace EP1 upon failure, and therefore, although re-routing may cause some packets to arrive at the destination out-of-order, delivery order is typically maintained shortly after the re-routing starts.

In some embodiments, when one of the routes via EP2 . . . EP5 fails, switch 28 re-routes the packets destined to the failing interface to another egress interface within the group. In FIG. 2, for example, the route via EP4 fails, and the switch re-routs packets that are normally forwarded via EP4 to EP5. The switch may re-route the packets via EP5 until a suitable condition is met, as described above. When EP1 is assigned statically for a given flow and additionally as a member of the AR group (e.g., group 50B), and some or all of EP2 . . . EP5 fail, the traffic addressed to these egress interfaces can be forwarded via EP1.

Figure 3:
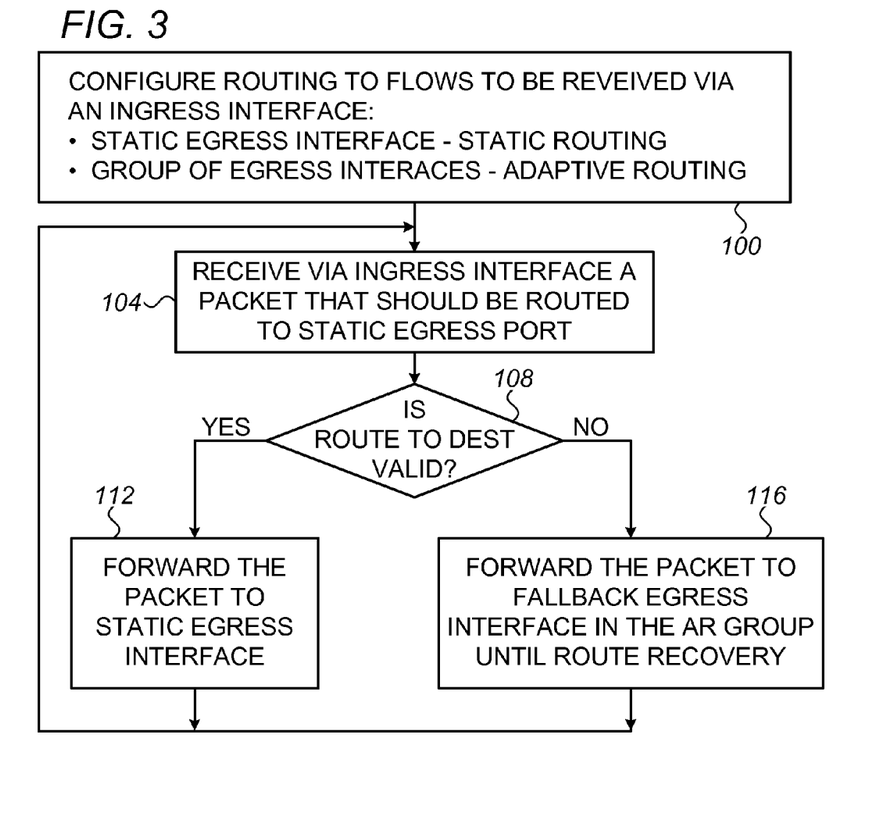
FIG. 3 is a flow chart that schematically illustrates a method for providing high availability, in accordance with an embodiment that is described herein.

FIG. 3 is a flow chart that schematically illustrates a method for providing high availability, in accordance with an embodiment that is described herein. The method is described with reference to switch 28 in FIGS. 1 and 2 above. In describing the method we first outline the flow chart in general and then provide additional implementation details and variants.

The method begins by control unit 44 of switch 28 configuring forwarding rules to a given ingress interface such as IP1 of FIG. 2, at a configuration step 100. The forwarding rules may be configured within switch fabric 40. In an embodiment, the switch may receive the routing configuration from a centralized element in the network such as SM 26. Alternatively or additionally, the switch determines the routing configuration by communicating routing information with other network switches using a routing protocol.

The forwarding rules configured at step 100 are typically based on certain fields in the packet headers. Such fields may include, for example, one or more of the source/destination address, source/destination port number and the underlying protocol type. In some embodiments, the switch calculates a hash function over one or more of the fields and uses the hash result for selecting a respective egress interface, as will be described in greater detail below.

In this example, control unit 44 assigns EP1 as a static egress interface to packets that require static routing, and an AR group EP2 . . . EP5 to packets that may be routed within the AR group using adaptive routing techniques. At a reception step 104, switch 28 receives via IP1 a packet that should be forwarded statically, and control unit 44 identifies that the packet should be forwarded via EP1. As noted above, in alternative embodiments, EP1 . . . EP5 are assigned for adaptive routing, wherein EP1 is additionally assigned for static routing for certain packets for which re-routing is not allowed.

At a validation step 108, the control unit checks whether a valid route exists from EP1 to the destination. When such a valid route exists, the switch forwards the packet via EP1, at a static forwarding step 112. Otherwise, the switch selects a fallback egress interface that belongs to the AR group, at a fallback forwarding step 116, and forwards the packet accordingly. Following steps 112 and 116, the method loops back to step 104 to receive subsequent packets via the ingress interface.

Control unit 44 may check the route validity at step 108 in various ways. In some embodiments, the switch senses the state of the link connecting to the selected egress interface to verify whether the link is up. In other embodiments, the switch receives from the network a notification that indicates that the route corresponding to the static routing has failed. In yet other embodiments, the control unit considers that a valid route exists when the network re-configures the switch using, for example, a SM or a routing protocol.

In the network, any suitable method can be used for remote signaling of a failing route. For example, U.S. patent application Ser. No. 13/754,921, filed Jan. 31, 2013, which is incorporated herein by reference, describes methods of this type that are collectively referred to as Adaptive Routing Notification (ARN). As another example, notifications of a failing route may be sent via Explicit Congestion Notification (ECN) packets that are conventionally used in congestion control.

The methods of FIGS. 2 and 3 are given by way of example, and other suitable methods can also be used. For example, although the method in FIG. 3 refers mainly to a group of egress interfaces that uses for adaptive routing, the method is similarly applicable when the group of egress interfaces uses for other purposes such as ECMP. As another example, although the method of FIG. 3 refers mainly to a case in which a static route fails, the method can be similarly used when one of the egress interfaces in the group fails. In this case, the packet received at step 104 should be routed via one of EP2 . . . EP5.

In one embodiment, the AR group (e.g., AR 50A in FIG. 2) does not include EP1, which is assigned for static routing of certain packets. In this embodiment, when all the egress interfaces of the AR group fail (e.g., EP2 . . . EP5 in FIG. 2), the switch forwards packets that are normally routed adaptively via the AR group, to EP1.

In the alternative embodiment in which EP1 is assigned for static routing of certain packets and also belongs to the AR group, when one or more of EP2 . . . EP5 fails the relevant packets may be forwarded via EP1.

Methods for Selecting a Fallback Egress Interface

At step 116 of the method of FIG. 3, the control unit may select a fallback egress interface out of EP2 . . . EP5 in various ways. In the description that follows we describe methods for selecting a fallback interface to the static route, as well as methods for selecting a fallback interface to one of the interfaces comprising the AR group or ECMP group. Generally, however, the described methods are applicable to both cases.

In some embodiments, the fallback egress interface is pre-configured, e.g., at step 100. Assigning fallback routes before they are actually required can be implemented efficiently in hardware, resulting in fast re-routing upon failure. The hardware can be configured to return to the static routing when the static route recovers or when the switch is re-configured. Although the description below refers mainly to an AR group that includes EP2 . . . EP5, the disclosed embodiments are applicable mutatis mutandis also to the case in which the AR group includes EP1 . . . EP5.

In other embodiments, selecting the fallback egress interface is based on flow parameters carried in certain fields of the packet headers. For example, the selection can be based on hashing the destination address of the packet. Alternatively, the selection is based on hashing various packet fields. Further alternatively, the selection may be based on the identity of the failing egress interface, i.e., re-routing all the traffic from the failing egress interface to another egress interface. This technique, however, may result in overloading the fallback egress interface. Further alternatively, when the routing via one of EP2 . . . EP5 fails, the control unit may select the first next egress interface within EP2 . . . EP5 (using cyclic counting) that has a valid route to the destination. For example, re-route to EP5 upon failure in forwarding via EP4. An egress interface that has a valid route to the destination is also referred to herein as a "valid egress interface".

As mentioned above, selecting a fallback egress interface may be based on calculating a hash function over one or more fields in the packet headers. We now describe several hash-based selection methods that can be used, for example, when EP2 . . . EP5 are configured as an ECMP group.

In an embodiment, the switch holds a mapping table that maps hash results to respective egress interfaces. In the present example, the mapping table additionally includes marking the validity status of the egress interfaces, i.e., an indication of whether there is a valid route from the egress interface to the destination. Table 1 depicts an example mapping table that maps six hash results to respective egress interfaces. Note that multiple hash results can be mapped to the same egress interface. For example, in Table 1 hash results 2 and 3 are mapped to egress interface 13, and hash results 4 and 5 are mapped to egress interface 14.

TABLE 1

Mapping hash results to egress interfaces.

| Table entry/<br>Hash result | Egress interface | Interface status |
| --- | --- | --- |
| 0 | EP11 | Valid |
| 1 | EP12 | Valid |
| 2 | EP13 | Invalid |
| 3 | EP13 | Invalid |
| 4 | EP14 | valid |
| 5 | EP14 | Valid |

In some embodiments, the switch comprises multiple mapping tables similar in structure to Table 1, and the control unit selects one of these mapping tables based, for example, on the destination address.

When the hash result maps to an egress interface that is marked as valid, the switch forwards the packet accordingly. Otherwise, the control unit selects a fallback egress interface out of the remaining valid egress interfaces as described herein. In one embodiment, the control unit calculates a hash function that has a number of hash results equal to the number of remaining egress interfaces. For example, when routing via EP13 fails, calculate a hash function that has four outcomes: 0,1,2,3 corresponding to the table entries 4,5,0,1, respectively. In other embodiments, the control unit removes from the mapping table entries of invalid egress interfaces and hashes over the packet fields using a hash function having a number of hash results equal to the remaining entries.

In an embodiment, selecting an egress interface involves calculating two or more different hash functions and using one of the hash results as required. In the example of Table 1 above, assume that the hash result generated by a default hash function equals three, which corresponds to the invalid egress interface EP13. Further assume that the switch calculates an additional hash function whose outcome equals four. In this case EP14 is selected since hash result four corresponds to the valid egress interface EP14. Re-selection of an egress interface using an alternative hash function is also referred to herein as "rehashing."

In some embodiments, the control unit applies rehashing one or more times, or selects a fallback egress interface at random, in attempt to select a valid egress interface, and after a limit number of attempts the control unit selects a predefined egress interface. In other embodiments, the control unit selects the fallback egress interface by cyclically advancing a predefined number of entries in the mapping table. In this case when the hash result equals 2 or 3 (both mapped to invalid EP13) the control unit advances three entries to entry 5 or 0, respectively.

High Availability in Fat-Tree Networks

The disclosed techniques are applicable in various network topologies. One popular network topology is Fat-Tree (FT), which is addressed, for example, by Ding et al., in "Level-wise Scheduling Algorithm for Fat Tree Interconnection Networks," Proceedings of the 2006 ACM/IEEE Conference on Supercomputing (SC 2006), November, 2006, which is incorporated herein by reference.

Figure 4:
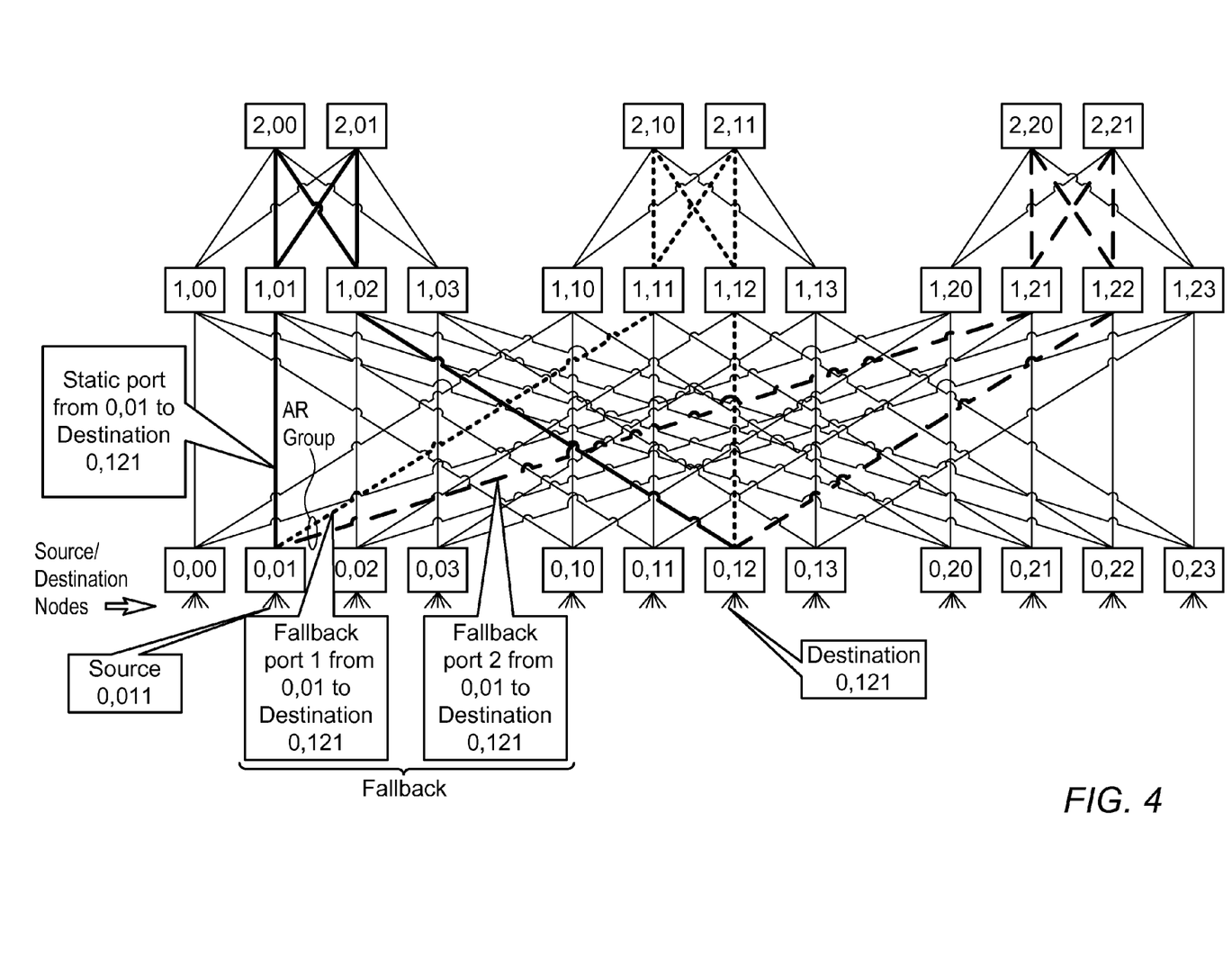
FIG. 4 is a diagram that schematically illustrates a Fat-Tree network that provides high availability, in accordance with an embodiment that is described herein.

FIG. 4 is a diagram that schematically illustrates a Fat-Tree (FT) network that provides high availability, in accordance with an embodiment that is described herein.

The network of FIG. 4 comprises a total of thirty switches that are interconnected by network links in a FT configuration.

The network is arranged in three levels: Level 0 (L0) comprises switches that are numbered (0,xx), Level 1 (L1) comprises switches that are numbered (1,xx), and Level 2 (L2) comprises switches that are numbered (2,xx). Clients (e.g., HCAs) are connected only to the down ports of the switches in L0. Each switch is similar to switches 28 of FIG. 1 above. A given switch may forward packets "upwards" to a higher level or "downwards" to a lower level. Each switch at level L0 has three ports that forward packets upwards to level L1. In the present example we assume that for a given destination one of these ports is configured as a static port and the other two ports are configured as an AR group and as fallback ports for the static port.

Consider now a source node (0,011) connecting to switch (0,01) that communicates with a destination node (0,121) connected to switch (0,12). To send packets over the static or adaptive routes, switch (0,01) should forward the packets that require static routing upwards to switch (1,01) and packets that require adaptive routing to switches (1,11) or (1,21). In one embodiment, for providing high availability, switch (0,01) may use the static route as long as the static route is functional, and re-route to using one of the adaptive routes as a fallback route when the static route fails. In other embodiments, upon failure of the static route, the source node communicates with the destination node over both the fallback routes, and when one of them fails, the traffic is routed via the other fallback route.

The FT topology configuration in FIG. 4 was given by way of example, and in alternative embodiments other suitable TF topologies as well as other network topologies can also be used. For example, in a FT topology in which three or more routes are available between a source and a destination, one route may serve for static routing and the other two routes as an AR group including a fallback route for the static route.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method comprising:
   in a network element that comprises multiple interfaces for connecting to a communication network, receiving via an ingress interface packets that are not allowed to undergo re-routing and that are addressed to a destination via a first egress interface;
   forwarding the packets via the first egress interface when there is a valid path from the first egress interface to the destination; and
   in response to detecting, by the network element, that there is no valid path from the first egress interface to the destination, selecting a second egress interface from a group of multiple egress interfaces that have respective paths to the destination and are assigned to packets for which re-routing is allowed, and forwarding the packets via the second egress interface until recovering a path to the destination.

2. The method according to claim 1 wherein the first egress interface is additionally assigned within the group of multiple egress interfaces only for packets for which re-routing is allowed.

3. The method according to claim 1, wherein the first egress interface is not assigned within the group of multiple egress interfaces for which re-routing is allowed.

4. The method according to claim 1, wherein selecting the second egress interface comprises switching to the second egress interface in response to receiving from the communication network a notification indicating that a route to the destination that traverses the first egress interface has failed.

5. The method according to claim 1, wherein recovering the path comprises re-configuring the network element based on a global, network-wide routing decision.

6. The method according to claim 1, wherein forwarding the packets via the second interface comprises forwarding all the packets destined to the first egress interface via the second egress interface.

7. The method according to claim 1, wherein selecting the second egress interface comprises choosing the second egress interface from among the multiple egress interfaces in the group, based on one or more fields in headers of the packets.

8. The method according to claim 7, wherein choosing the second egress interface comprises holding a table that maps hash results calculated over the fields to respective egress interfaces in the group.

9. The method according to claim 8, wherein choosing the second egress interface comprises calculating a hash function having a number of hash results equal to a number of entries of the table that are mapped to egress interfaces that have a valid path to the destination.

10. The method according to claim 8, wherein choosing the second egress interface comprises removing from the table one or more entries that are mapped to one or more egress interfaces that have no valid paths to the destination, and calculating a hash function having a number of hash results equal to a remaining number of entries corresponding to egress interfaces that have valid paths to the destination.

11. The method according to claim 1, wherein selecting the second egress interface comprises switching to the second egress interface once, and not re-switching again until recovering the path to the destination or until forwarding the packets via the second egress interface to the destination fails.

12. The method according to claim 1, and comprising receiving via the ingress interface packets to be delivered to the destination via a third egress interface that belongs to the group, forwarding the packets via the third egress interface when there is a valid path from the third egress interface to the destination, and, when there is no valid path from the third egress interface to the destination, selecting a fourth egress interface within the group that has a valid path to the destination, and forwarding the packets via the fourth egress interface until recovering a path to the destination.

13. A network element, comprising:
multiple interfaces, which are configured to connect to a communication network; and
switching circuitry, which is configured to receive via an ingress interface packets that are not allowed to undergo re-routing and that are addressed to a destination via a first egress interface, to forward the packets via the first egress interface when there is a valid path from the first egress interface to the destination, and, in response to detecting that there is no valid path from the first egress interface to the destination, to select a second egress interface from a group of multiple egress interfaces that have respective paths to the destination and are assigned to packets for which re-routing is allowed, and to forward the packets via the second egress interface until recovering a path to the destination.

14. The network element according to claim 13 wherein the switching circuitry is configured to assign the first egress interface within the group of multiple egress interfaces only for packets for which re-routing is allowed.

15. The method according to claim 13, wherein the switching circuitry is configured not to assign the first egress interface within the group of multiple egress interfaces for which re-routing is allowed.

16. The network element according to claim 13, wherein the switching circuitry is configured to switch to the second egress interface in response to receiving from the communication network a notification indicating that a route to the destination that traverses the first egress interface has failed.

17. The network element according to claim 13, wherein the switching circuitry is configured to recover the path by re-configuring the network element based on a global, network-wide routing decision.

18. The network element according to claim 13, wherein the switching circuitry is configured to forward all the packets destined to the first egress interface via the second egress interface.

19. The network element according to claim 13, wherein the switching circuitry is configured to choose the second egress interface from among the multiple egress interfaces in the group, based on one or more fields in headers of the packets.

20. The network element according to claim 19, wherein the switching circuitry is configured to choose the second egress interface by holding a table that maps hash results calculated over the fields to respective egress interfaces in the group.

21. The network element according to claim 20, wherein the switching circuitry is configured to choose the second egress interface by calculating a hash function having a number of hash results equal to a number of entries of the table that are mapped to egress interfaces that have a valid path to the destination.

22. The network element according to claim 20, wherein the switching circuitry is configured to choose the second egress interface by removing from the table one or more entries that are mapped to one or more egress interfaces that have no valid paths to the destination, and to calculate a hash function having a number of hash results equal to a remaining number of entries corresponding to egress interfaces that have valid paths to the destination.

23. The network element according to claim 13, wherein the switching circuitry is configured to switch to the second egress interface once, and to not re-switch again until recovering the path to the destination or until forwarding the packets via the second egress interface to the destination fails.

24. The network element according to claim 13, wherein the switching circuitry is configured to receive via the ingress interface packets to be delivered to the destination via a third egress interface that belongs to the group, to forward the packets via the third egress interface when there is a valid path from the third egress interface to the destination, and, when there is no valid path from the third egress interface to the destination, to select a fourth egress interface within the group that has a valid path to the destination, and to forward the packets via the fourth egress interface until recovering a path to the destination.

25. A method comprising:
in a network element that comprises multiple interfaces for connecting to a communication network, receiving via an ingress interface a packet for which re-routing is allowed and that is addressed to a destination via a group of multiple first egress interfaces that have respective paths to the destination;
forwarding the packet to the destination, via the group, when there is a valid path from at least one of the first egress interfaces to the destination; and
in response to detecting, by the network element, that there is no valid path from any of the first egress interfaces to the destination, selecting a second egress interface outside the group that has a valid path to the destination, and forwarding the packet via the second egress interface until recovering a path from the first egress interfaces to the destination.

26. A network element, comprising:
multiple interfaces, which are configured to connect to a communication network; and
switching circuitry, which is configured to receive via an ingress interface a packet for which re-routing is allowed and that is addressed to a destination via a group of multiple first egress interfaces that have respective paths to the destination, to forward the packet to the destination, via the group, when there is a valid path from at least one of the first egress interfaces to the destination, and, in response to detecting that there is no valid path from any of the first egress interfaces to the destination, to select a second egress interface outside the group that has a valid path to the destination, and to forward the packet via the second egress interface until recovering a path from the first egress interfaces to the destination.

* * * * *